United States Patent [19]
Ohori et al.

[11] Patent Number: 5,326,158
[45] Date of Patent: Jul. 5, 1994

[54] BRAKE CONTROLLING APPARATUS FOR ELECTRIC VEHICLE

[75] Inventors: Harumi Ohori, Toyota; Shirou Monzaki, Susono, both of Japan

[73] Assignee: Toyota Jidosha Kabushiki Kaisha, Toyota, Japan

[21] Appl. No.: 991,196

[22] Filed: Dec. 16, 1992

[30] Foreign Application Priority Data

Dec. 24, 1991 [JP] Japan .................... 3-341300

[51] Int. Cl.$^5$ .................... B60L 7/24; B60T 13/74
[52] U.S. Cl. .................... 303/3; 188/156; 188/159; 188/181 T; 303/15; 303/DIG. 3
[58] Field of Search ......... 303/2, 3, 15, 20, 13, 303/14, 16, 17, 18, DIG. 3, 112; 188/156, 158, 159, 106 P, 161-165, 181 T; 318/370, 376, 382

[56] References Cited

U.S. PATENT DOCUMENTS

| | | | |
|---|---|---|---|
| 4,181,366 | 1/1980 | Dobner | 303/3 |
| 4,425,005 | 1/1984 | Warwick | 303/3 |
| 4,671,576 | 6/1987 | Fourie | 188/156 X |
| 4,993,780 | 2/1991 | Tanaka et al. | 303/3 |
| 5,050,936 | 9/1991 | Tanaka et al. | 303/3 |

FOREIGN PATENT DOCUMENTS

| | | | |
|---|---|---|---|
| 2545542 | 4/1976 | Fed. Rep. of Germany | 303/3 |
| 63-29301 | 2/1988 | Japan . | |

OTHER PUBLICATIONS

Ohori Application "Brake Control System of Electric Vehicle", TYA-2083 filed Dec. 16, 1992.

Primary Examiner—Robert J. Oberleitner
Assistant Examiner—Peter M. Poon
Attorney, Agent, or Firm—Cushman, Darby & Cushman

[57] ABSTRACT

A brake controlling apparatus in an electric vehicle comprising a hydraulic brake including a fluid pressure generating and applying device having a characteristic in which the fluid consumption rises in the fluid-pressure range of 0 to $P_0$, and brakes the driving wheels by the fluid pressure of the fluid pressure applying device. A regenerative brake brakes the driving wheels by the regeneration of the power of a driving motor. A fluid flow cut-off device cuts off the flow of hydraulic fluid from the fluid pressure generating device to the fluid pressure applying device when the fluid pressure of the fluid pressure generating device exceeds $P_0$. A fluid flow inducing device induces the flow of hydraulic fluid from the fluid pressure generating device to the fluid pressure applying device while maintaining the pressure difference between the fluid pressure generating and applying devices when the pressure difference exceeds $\Delta P_r$. A fluid consuming device consumes the hydraulic fluid of the fluid pressure generating device with the characteristic approximate to the fluid consumption characteristic of the fluid pressure applying device when the fluid flow inducing device is inoperative. A regenerative braking controlling device controls the regenerative brake in correspondence with the pressure difference between the fluid pressure generating device and the fluid pressure applying device. The fluid consumption characteristic seen from the fluid pressure generating device is substantially the same as the fluid consumption characteristic of the fluid pressure applying device.

20 Claims, 12 Drawing Sheets

BRAKE CONTROLLING APPARATUS FOR ELECTRIC VEHICLE

BACKGROUND OF THE INVENTION

Field of the Invention

The present invention relates to an electric vehicle provided with a hydraulic braking means and a regenerative braking means and, more particularly, an improvement of a brake controlling apparatus for adjusting the hydraulic braking force in accordance with the required braking force.

Cross Reference of Copending Application

The copending application related to the present invention is "BRAKE CONTROLLING APPARATUS FOR ELECTRIC VEHICLE" (Japanese Patent Application No. Hei 3-338545) filed on Dec. 20, 1991 in Japanese Patent Office. Part of the technical explanation thereof will be described in *Applicability of the Copending Application* of the specification of the present invention with reference to FIGS. 10 to 12B.

Description of the Prior Art

Electric vehicles are driven by a motor. They adopt as a braking means, for example, a hydraulic brake, and a regenerative brake using the primary current control of the motor or the like.

Hydraulic brakes are widely used for electric vehicles and other vehicles. In a hydraulic brake, the fluid pressure corresponding to the amount of stepping of the brake pedal is transmitted through a pipe so as to brake front and/or rear wheels. This type of brake mechanically brakes wheels, whether they are driving wheels or not.

A regenerative brake is driven with the regeneration of the power from the driving motor as a principle. A regenerative brake is therefore installed mainly in vehicles driven by motors (not only an ordinary electric vehicle but also a hybrid vehicle provided with an engine as well as a motor). In the case of using an AC induction motor as a driving motor, for example, it is possible to obtain the necessary output torque from the motor by controlling the primary current of the induction motor. The primary current vector of the induction motor is controlled, for example, by a PWM control signal (a pulse width modulated signal) over an inverter circuit. Regenerative braking is realized as part of the torque control by controlling the primary current so that the energy from the motor is returned to the battery or the like, thereby obtaining a regeneration torque from the motor. A regenerative brake therefore exclusively brakes driving wheels.

In the case of using a hydraulic brake together with a regenerative brake, it is necessary to control the distribution of the braking force between the driving wheels and idler wheels. For example, in a vehicle having the front wheels (hereinunder referred to as "FW"s) as the driving wheels and the rear wheels (hereinunder referred to as "RW"s) as the idler wheels, if the RWs are braked by the hydraulic brake and the FWs are braked by the hydraulic brake and the regenerative brake, the braking force for the FWs is larger than the braking force for the RWs by the amount corresponding to the braking force of the regenerative brake.

From this point of view, the structure for braking the FWs and the RWs of an electric vehicle with a good distribution of the braking force therebetween has already been proposed (Japanese Utility Model Laid-Open No. Sho 63-29301). In this structure, the FWs as the driving wheels are braked by a regenerative brake and the RWs as the idler wheels are braked by a hydraulic brake. Furthermore, the fluid pressure is controlled so that the distribution of the braking force is the optimum. According to this structure, efficient regeneration of the power of the motor is possible, so that the distance covered per unit charge of the battery as the motor driving source is prolonged.

However, if the braking force is adjusted by a change of the fluid pressure, although the distribution of the braking force is optimized and the premature locking of the FWs as driving wheels is prevented, the stroke of the brake pedal is changed, so that the feeling of smooth braking is impaired.

Applicability of the Copending Application

As a countermeasure, it is possible to control only the regenerative brake without controlling the hydraulic brake. For example, as shown in FIG. 9, it is possible to adjust the braking force of the regenerative brake to $F_{reg}$ in correspondence with the braking force $F_{brk}$ of the hydraulic brake (e.g., an oil brake) in order to obtain the total braking force $F_0$. In this structure, however, it is impossible to effectively utilize regenerative braking, so that the recovery of the power to the battery is not efficient. In the example shown in FIG. 9, after the braking force $F_{reg}$ of the regenerative brake reaches its maximum, the relationship between the stepping amount of the brake pedal (fluid pressure of the brake) and the braking force $F_0$ becomes nonlinear.

The control shown in FIG. 10 solves these problems. In FIG. 10, the transmission of the fluid pressure to the wheels to be braked is cut off and only the braking force $F_{reg}'$ of the regenerative brake is used until the fluid pressure of the brake, more strictly, the fluid pressure of the master cylinder (hereinunder referred to as "M/C") exceeds a predetermined value $\Delta P_r$. After the fluid pressure of the M/C exceeds the predetermined value $\Delta P_r$, both the hydraulic brake and the regenerative brake are used. At this time, if the regenerative brake is so designed that the braking force $F_{reg}$, reaches its maximum at $\Delta P_r$, the relationship between the fluid pressure of the M/C and the braking force $F_0$ becomes linear, and regenerative braking is effectively utilized. This control can be realized by diverting the hardware proposed by the applicant of the present invention (Japanese Patent Application No. Hei 3-338545) and shown in FIG. 11.

The electric vehicle shown in FIG. 11 uses FWs 10 as the driving wheels and RWs (not shown) as the idler wheels. The FWs 10 are driven by a motor 14 through a transmission (hereinunder referred to as "T/M") 12. The motor 14 outputs the necessary torque under the control of an ECU 16.

The motor 14 is an AC induction motor the output torque of which is controllable. In driving the motor 14, a DC voltage output from a battery (not shown) is converted into an AC current by an inverter circuit (not shown), and the AC current is supplied to the motor 14. At this time, by the PWM control of the switching element which constitutes the inverter circuit, the vector control of the AC current being output is possible, thereby controlling the output torque of the motor 14 by the ECU 16. That is, the output torque of the motor is actually controlled as the PWM control over the inverter circuit.

Braking of the FWs 10 by the regeneration of the power from the motor 14 is executed as such a torque control. The motor 14 has such a regeneration property as is shown in FIG. 12B, and the regeneration torque (regenerative braking force) $F_{reg}'$ is generated in accordance with the number of revolutions of the motor 14.

A hydraulic brake system in addition to such a regenerative brake system are installed in the electric vehicle shown in FIG. 11. The hydraulic brake system is composed of: an M/C 20 for generating a fluid pressure corresponding to the stepping amount of a brake pedal 18; wheel cylinders (hereinunder referred to as "W/Cs") 26 provided in the FWs 10; W/Cs (not shown) provided in RWs (not shown); pipes 22 and 24 for connecting one of the hydraulic chambers in the M/C 20 to the W/Cs 26; and a pipe 28 for connecting the other hydraulic chamber in the M/C 20 to the W/Cs provided in the RWs. The fluid pressure generated in each of the hydraulic chambers of the M/C 20 is transmitted to the corresponding W/Cs. Therefore, the FWs 10 as the driving wheels are braked by the regenerative brake and the hydraulic brake, while the RWs as the idler wheels are braked only by the hydraulic brake.

The hydraulic brake system is further provided with a means for cutting off the transmission of the fluid pressure between the pipes 22 and 24. This means is used in order to optimize the distribution of the braking force between the FWs and the RWs. The hydraulic brake system is also provided with a means simulating the fluid consumption characteristic of the W/Cs while the transmission of the fluid pressure is cut off, thereby improving the feeling of braking.

As the means for cutting off the transmission of the fluid pressure, a relief valve 30 is provided. The relief valve 30 is so designed as to be inserted between the pipes 22 and 24 when a solenoid valve 32 is off and to be bypassed when the solenoid valve 32 is on. The relief valve 30 is closed when the pressure difference is not more than the set value (valve opening pressure) while it is open when the pressure difference exceeds the valve opening pressure. Therefore, when the solenoid valve 32 is off, the transmission of the fluid pressure between the pipes 22 and 24 is cut off or induced in accordance with the pressure difference between the pipes 22 and 24. The valve opening pressure of the relief valve 30 is set at $\Delta P_r$ shown in FIG. 10. $\Delta P_r$ corresponds to the fluid pressure of the M/C 20 (hereinunder referred to as "M/C pressure") at which the regenerative braking force $F_{reg}'$ reaches its maximum when the regenerative braking force $F_{reg}'$ is increased with the same gradient relative to the M/C pressure as the hydraulic braking force. A check valve 34 is further provided in parallel to the relief valve 30 in order to maintain the pressure difference $\Delta P$ between the M/C 20 and the W/Cs 26. In addition, a fluid pressure sensor 36 for detecting the pressure difference $\Delta P$ is provided in order to enable the adjustment of the regenerative braking force $F_{reg}$ in accordance with the pressure difference $\Delta P$.

A stroke simulator (hereinunder referred to as "S/S") 38 is provided as a means for simulating the fluid consumption characteristic of W/Cs 26 when the transmission of the fluid pressure is cut off. The S/S 38 consumes the hydraulic fluid of the M/C 20 in a similar way to the W/Cs 26 when the transmission of the fluid pressure is cut off by the relief valve 30. The maximum fluid consumption is set in correspondence with the valve opening pressure of the relief valve 30. Accordingly, the fluid consumption of the S/S 38 reaches its maximum when the relief valve 30 turns opening state. In other words, the S/S 38 is then bottomed.

FIG. 12A is a flowchart of the control of the ECU 16 when the structure shown in FIG. 11 is diverted to the control of the brake power distribution, and FIG. 12B shows the point at which the solenoid valve 32 is turned on/off.

The ECU 16 first judges whether or not a brake pedal switch 40 is on (step 100). The brake pedal switch 40 is attached to the brake pedal 18 and is turned on when the brake pedal 18 is pressed down. That is, the ECU 16 judges whether or not the brake pedal 18 has been pressed down at step 100. If the brake pedal 28 is judged not to have been pressed down, the ECU 16 turns off the solenoid valve 32 (step 102) so as to cut off the connection between the pipes 22 and 24 by the relief valve 30. The ECU 16 sets the regeneration torque command value for the motor 14 at 0 (step 104). In this case, therefore, no braking force is supplied to the FWs 10 and the RWs.

If the brake pedal 28 is judged to have been pressed down at step 100, the ECU 16 judges whether or not the number of revolutions of the motor 14, which is detected by a revolution sensor 42, exceeds $\omega_1$ (step 106). $\omega_1$ is a boundary number of revolutions at which the maximum regenerative braking force suddenly drops, as shown in FIG. 12B.

If the number of revolutions exceeds $\omega_1$, the ECU 16 turns off the solenoid valve 32 (step 108). By this operation, the relief valve 30 is inserted between the pipes 22 and 24. If the pressure difference $\Delta P$ is too small to exceed the valve opening pressure for the relief valve 30, the relief valve 30 remains closed. On the other hand, if the pressure difference $\Delta P$ exceeds the valve opening pressure for the relief valve 30, the relief valve 30 is opened, thereby inducing the transmission of the fluid pressure to the W/Cs 26.

After the execution of step 108, the ECU 16 executes steps 110 and 112. At step 110, the ECU 16 calculates the regeneration torque command value on the basis of the pressure difference $\Delta P$ which is maintained by the check valve 34 and detected by the fluid pressure sensor 36. At step 112, the calculated regeneration torque command value is supplied to the motor 14 (more specifically, the inverter circuit (not shown)). The process then returns to step 100.

If the number of revolutions is too small to exceed $\omega_1$ at step 106, it is impossible to obtain an adequate regenerative braking force, as shown in FIG. 12B. Therefore, in order to brake the FWs 10 by the hydraulic braking force, the ECU 16 issues a turn-on command to the solenoid valve 32 (step 114). By this operation, the pipes 22 and 24 are directly connected, and the hydraulic braking force acts on the W/Cs 26 without a reduction in the pressure. The process then returns to step 100.

This control enables good distribution of the braking force between the FWs and RWs, and establishes a linear relationship between the total braking force and the M/C pressure, as shown in FIG. 10. In addition, since the fluid consumption of the W/Cs 26 is simulated by the S/S 38, the feeling of braking is improved.

Even this control, however, cannot completely solve the problem in the feeling of braking especially in the range in which the W/C pressure is low. In the W/C 26, the fluid consumption generally shows the characteristic such as that shown in FIG. 13. In FIG. 13, when the W/C pressure is not higher than $P_0$ (as low as about 0.1 to 0.2 MPa), the fluid consumption rapidly increases, and after the W/C pressure reaches $P_0$, the fluid consumption gradually increases. The stroke of the M/C 20 is determined by the total fluid consumption of the W/C 26 and the S/S 38. Accordingly, if the W/C pressure is 0 in the range in which the M/C pressure is low, as shown in FIG. 10, the M/C stroke in this range is determined by the fluid consumption of the S/S 38. If there is a difference between the M/C pressure and the W/C pressure in the range in which the M/C pressure exceeds $\Delta P_r$, the M/C stroke in this range is determined by the total amount of fluid consumption of the W/C 26 and the S/S 38. Consequently, the M/C stroke in the control shown in FIG. 10 is greatly different from the M/C stroke obtained by using only the W/Cs 26, as shown in FIG. 14. This difference engenders an uneasy feeling during the braking operation.

SUMMARY OF THE INVENTION

Accordingly, it is an object of the present invention to eliminate the above-described problems and to provide a brake controlling apparatus which improves the M/C stroke while utilizing a regenerative brake effectively, thereby improving the feeling of braking.

To achieve this aim, the present invention provides a brake controlling apparatus installed in an electric vehicle provided with a hydraulic braking means and a regenerative braking means, wherein the hydraulic braking means includes a fluid pressure generating means (e.g., an M/C) for generating a fluid pressure in accordance with the command for braking and fluid pressure applying means (e.g., W/C) having a characteristic in which the fluid consumption rises in the fluid-pressure range of 0 to $P_0$, and brakes at least the driving wheels by the fluid pressure of the fluid pressure applying means, and the regenerative braking means brakes the driving wheels by the regeneration of the power of a driving motor, the brake controlling apparatus comprising:

(a) a fluid flow cut-off means for cutting off the flow of hydraulic fluid from the fluid pressure generating means to the fluid pressure applying means when the fluid pressure of the fluid pressure generating means exceeds $P_0$;

(b) a fluid flow inducing means for inducing the flow of hydraulic fluid from the fluid pressure generating means to the fluid pressure applying means while maintaining the pressure difference between the fluid pressure generating means and the fluid pressure applying means when the pressure difference exceeds $\Delta P_r$;

(c) a fluid consuming means for consuming the hydraulic fluid of the fluid pressure generating means with the characteristic approximate to the fluid consumption characteristic of the fluid pressure applying means when the fluid flow inducing means is inoperative; and (d) a regenerative braking controlling means for controlling the regenerative braking means in correspondence with the pressure difference between the fluid pressure generating means and the fluid pressure applying means;

wherein the fluid consumption characteristic seen from the fluid pressure generating means is approximate to (substantially the same as) the fluid consumption characteristic of the fluid pressure applying means.

In the present invention, the driving wheels are braked by the hydraulic braking means and the regenerative braking means. When the fluid pressure of the fluid pressure generating means is not higher than $P_0$, the hydraulic fluid from the fluid pressure generating means is consumed by the fluid pressure applying means. In other words, in the range in which the fluid pressure applying means has a steep characteristic curve of fluid consumption, the fluid pressure applying means consumes the hydraulic fluid. In the range in which the fluid pressure of the fluid pressure generating means is $P_0$ to $P_0+\Delta P_r$, the flow of hydraulic fluid from the fluid pressure generating means to the fluid pressure applying means is cut off, and the fluid pressure in the fluid pressure applying means is maintained at $P_0$. At this time, the regenerative braking means is controlled in correspondence with the difference between the fluid pressure of the fluid pressure generating means and the fluid pressure of the fluid pressure applying means, whereby the total braking force for braking the driving wheels, corresponding to the stepping amount of the brake pedal, is secured and the hydraulic fluid is consumed by the fluid consuming means such as a stroke simulator (hereinunder referred to as "S/S") with the fluid consumption characteristic which is approximate to that of the fluid pressure applying means. As a result, the fluid consumption characteristic, namely, the stroke observed at the fluid pressure applying means agrees with the stroke obtained by using only the fluid pressure applying means, thereby improving the feeling of braking.

The present invention may be embodied in various ways.

A first example of the fluid flow cut-off means is composed of: a valve which is inserted between the fluid pressure generating means and the fluid pressure applying means so as to be opened or closed under control; a means for detecting the fluid pressure of the fluid pressure generating means; a means for judging whether or not the fluid pressure of the fluid pressure generating means exceeds $P_0$; and a means for forcibly opening the valve when the fluid pressure of the fluid pressure generating means is judged to be not higher than $P_0$.

A second example of the fluid flow cut-off means is composed of: a first valve which is inserted between the fluid pressure generating means and the fluid pressure applying means so as to be opened or closed under control; a second valve which is inserted between the fluid pressure generating means and the first valve so as to be opened or closed under control; a means for detecting the fluid pressure of the fluid pressure generating means; a means for detecting the fluid pressure of the fluid pressure applying means; a means for judging whether or not the fluid pressure of the fluid pressure generating means exceeds $P_0$; a means for forcibly opening the first valve when the fluid pressure of the fluid pressure generating means is judged to be not higher than $P_0$; a means for judging whether or not the fluid pressure of the fluid pressure applying means is higher than $P_1$ which is not lower than $P_0$; and a means for forcibly opening the second valve when the fluid pressure of the fluid pressure applying means is judged to be higher than $P_1$, and forcibly closing the second valve when the fluid pressure of the fluid pressure applying means is judged to be not higher than $P_1$.

In the first example of the fluid flow cut-off means, it is preferable to set the maximum fluid consumption of the fluid consuming means so that the fluid consumption of the fluid consuming means reaches its maximum at the point of time when the fluid flow inducing means is operative. If the maximum fluid consumption of the fluid consuming means is set as described above, the same function as that of the second example is realized by a simpler structure and a simpler control process. In the second example, it is preferable to set the maximum fluid consumption of the fluid consuming means so that the fluid consumption of the fluid consuming means does not reach its maximum while the fluid flow inducing means is inoperative.

In a third example of the fluid flow cut-off means, the flow of the hydraulic fluid is cut off not by an electrical control of a valve but by a mechanical system. More specifically, a cut valve is provided between the fluid pressure generating means and the fluid pressure applying means. The cut valve has a cut-off mechanism for cutting off the flow of the hydraulic fluid to the fluid pressure applying means when the fluid pressure of the fluid pressure generating means exceeds $P_0$. The introduction of such a mechanism enhances the reliability of the apparatus.

The preferred cut-off mechanism is, for example, composed of: a first chamber into which the hydraulic fluid of the fluid pressure generating means is introduced; a second chamber which communicates with the fluid pressure applying means; a movable member for partitioning the first chamber and the second chamber; an urging member for urging the movable member toward the first chamber, the urging force of the urging member being approximately equal to the synthesis of the force applied to the moving member by the hydraulic fluid existing in the first chamber and the force applied to the moving member by the hydraulic fluid existing in the second chamber when the fluid pressure of the fluid pressure generating means is $P_0$; a passage for connecting the first chamber and the second chamber; and a valve for cutting off the communication between the second chamber and the fluid pressure applying means when the synthesized force is larger than the urging force of the urging member. The cut valve may have a fluid introducing mechanism for introducing the hydraulic fluid of the fluid pressure generating means to the fluid consuming means. The fluid introducing means is, for example, composed of: a third chamber which communicates with the first chamber; and a valve which is opened when the fluid pressure of the first chamber is higher than a predetermined value so as to introduce the hydraulic fluid in the third chamber to the fluid consuming means.

The fluid flow inducing means is, for example, composed of: a reducing valve inserted between the fluid pressure generating means and the fluid pressure applying means so as to be opened when the pressure difference therebetween exceeds $\Delta P_r$; and a check valve inserted between the fluid pressure generating means and the fluid pressure applying means so as to maintain the pressure difference therebetween; wherein the fluid consumption of the fluid consuming means (e.g., an S/S provided closer to the fluid pressure generating means as observed at the first valve so as to consume the hydraulic fluid of the fluid pressure generating means with the fluid consumption characteristic which is approximate to that of the fluid pressure applying means) reaches its maximum when the reducing valve is opened.

The regenerative braking means is, for example, composed of: a power converting means for converting a DC power into an AC power and supplying the converted power to the driving motor; and a means for controlling the power converting means in correspondence with the required regenerative braking force so as to generate the required regenerative braking force. The regenerative braking controlling means is, for example, composed of: a means for detecting the fluid pressure of the fluid pressure generating means; a means for detecting the fluid pressure of the fluid pressure applying means; a means for obtaining the difference between the fluid pressure of the fluid pressure generating means and the fluid pressure of the fluid pressure applying means; and a means for commanding the regenerative braking means to output the regenerative braking force on the basis of the pressure difference obtained.

The regenerative braking controlling means controls the regenerative braking means in the following way when the wheels are not braked. The regenerative braking controlling means first detects the command for braking. If the command for braking is not output, the regenerative braking controlling means cuts off the flow of the hydraulic fluid from the fluid pressure generating means to the fluid pressure applying means, and simultaneously commands the regenerative braking means not to execute regenerative braking.

The hydraulic braking means may further be provided with, for example, a booster for increasing the pressure caused by the stepping of the brake pedal and applying the increased pressure force to the fluid pressure generating means; a pipe for connecting the fluid pressure generating means with the fluid flow cut-off means and the fluid flow inducing means, and a pipe for connecting the fluid flow cut-off means and the fluid flow inducing means with the fluid pressure applying means. The hydraulic braking means may also brake the idler wheels.

The above and other objects, features and advantages of the present invention will become clear from the following description of the preferred embodiments thereof, taken in conjunction with the accompanying drawings.

BRIEF DESCRIPTION OF THE DRAWINGS

FIGS. 3A to 3F show various characteristics of the first embodiment, wherein

FIG. 3A shows the characteristic of the W/C pressure with respect to the M/C pressure, FIG. 3B shows the characteristic of the regenerative braking torque, FIG. 3C shows the characteristic of the braking force, FIG. 3D shows the fluid consumption characteristic of the W/C, FIG. 3E shows the fluid consumption characteristic of the S/S, and FIG. 3F shows the characteristic of the M/C stroke;

DESCRIPTION OF THE PREFERRED EMBODIMENT

Figure 1:
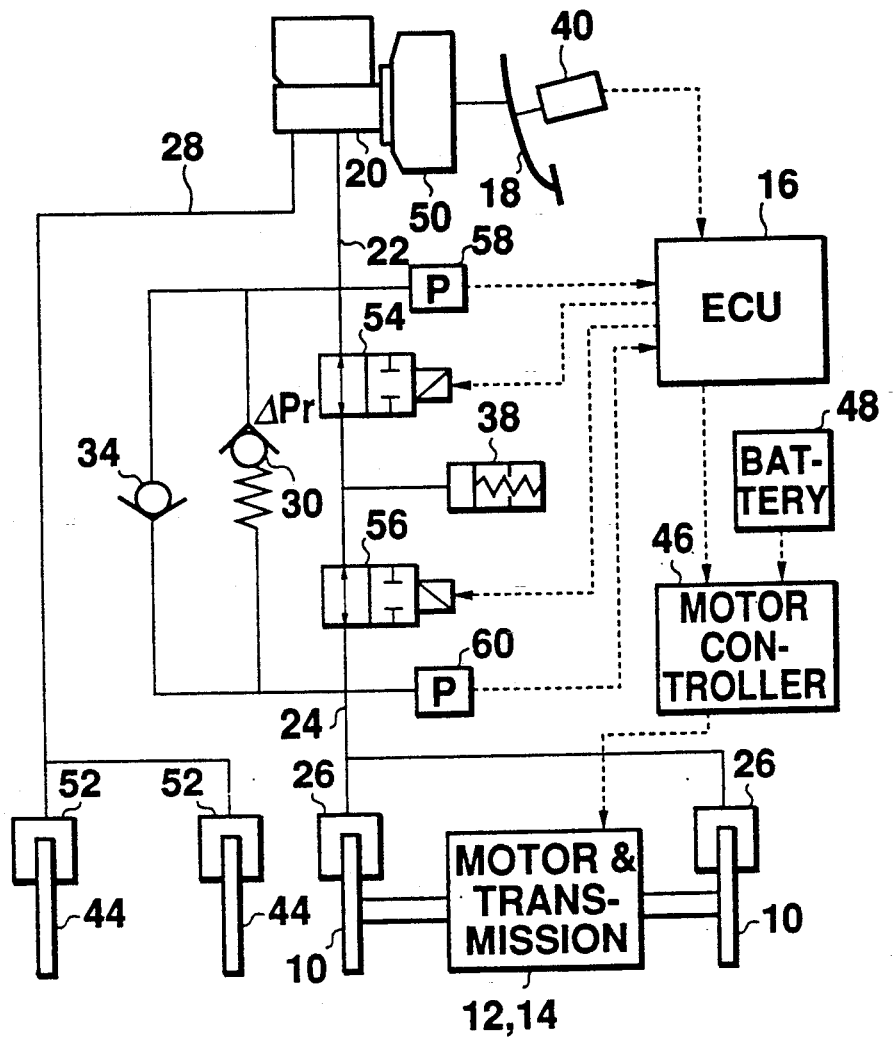
FIG. 1 is a schematic block diagram of the structure of an electric vehicle provided with a first embodiment of a brake controlling apparatus according to the present invention.

Preferred embodiments of a brake controlling apparatus according to the present invention will now be explained with reference to the accompanying drawings. The same reference numerals will be provided for the elements or numeral values which are the same as those in FIGS. 9 to 14 in order to simplify the explanation. In the structures shown in FIGS. 1, 4 and 6, each solid line connecting elements represents a pipe for transmitting a fluid pressure and each broken line connecting elements represents a wire for transmitting an electric signal or electric power.

First Embodiment

The electric vehicle shown in FIG. 1 is provided with a first embodiment of a brake controlling apparatus according to the present invention. In FIG. 1, the T/M 12 and the motor 14 are denoted by a single block in order to simplify the drawing.

The electric vehicle shown in FIG. 1 uses the FWs 10 as the driving wheels and RWs 44 as the idler wheels. The motor 14 is an AC induction motor and is driven by the AC current output from a motor controller 46. The motor controller 46 is provided therein with an inverter circuit for converting a DC voltage output from a battery 48 into an AC current under the control of the ECU 16. That is, the ECU 16 controls the inverter circuit provided in the motor controller 46 by PWM signal, and the vector of the AC current supplied from the motor controller 46 to the motor 14 is controlled (vector control). The output torque of the motor 14 is determined by the primary current supplied from the motor controller 46. The output torque of the motor 14 is thus controlled by the ECU 16. Regenerative braking is also controlled by PWM signal. Control over the regenerative brake is different from that shown in FIG. 12, as will be described later.

Figure 11:
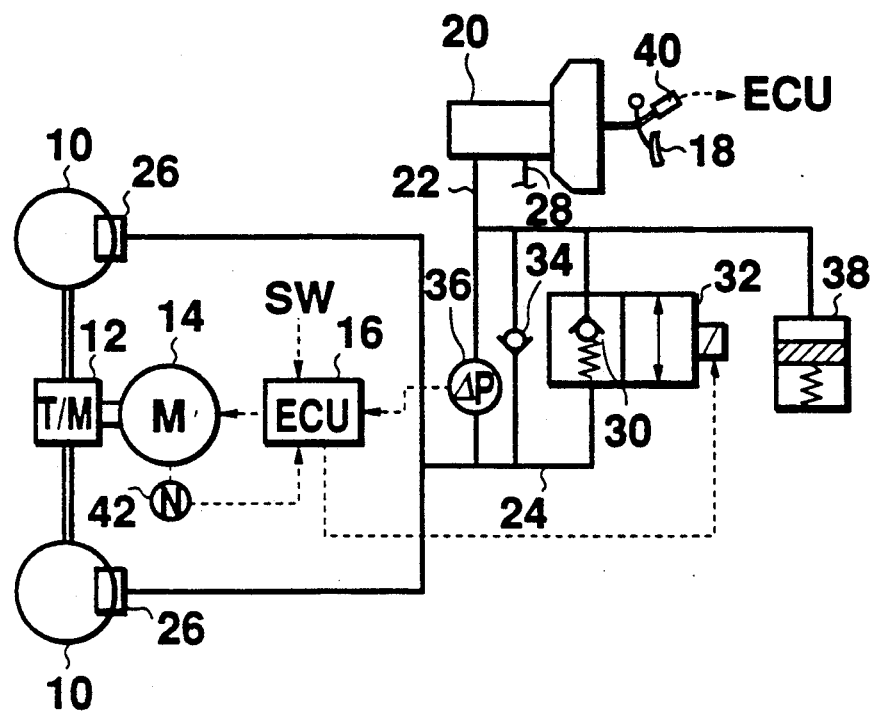
FIG. 11 is a schematic block diagram of the structure of an electric vehicle provided with a brake controlling apparatus disclosed in the copending application (Japanese Patent Application No. Hei 3-338545) filed by the applicant of the present invention.
Figure 12A:
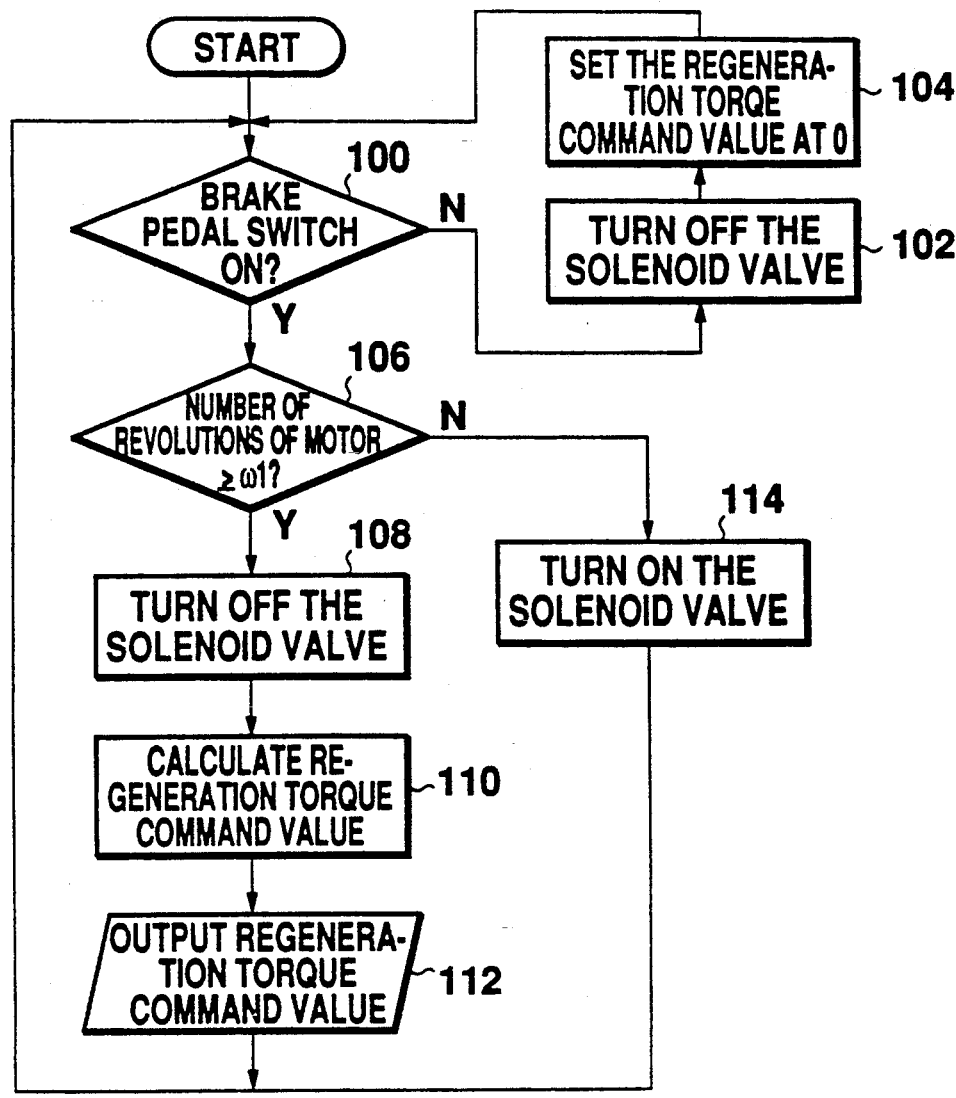
FIG. 12A is a flowchart of the control shown in FIG. 10 by the structure shown in FIG. 11.
Figure 12B:
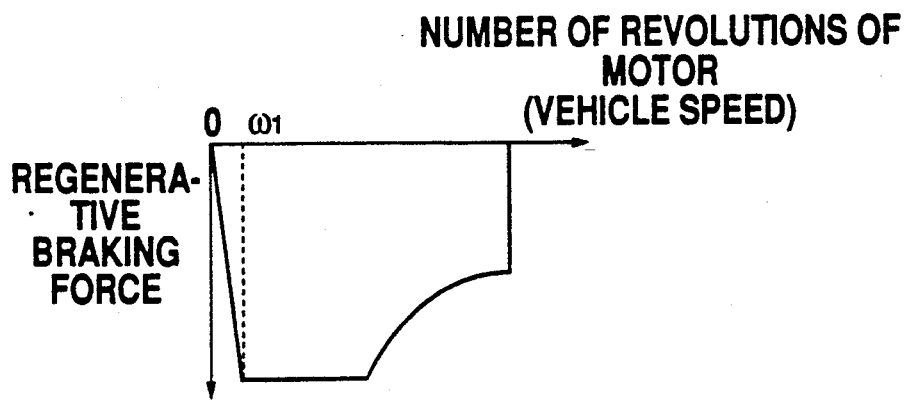
FIG. 12B shows the change-over point of the solenoid valve in the control shown in FIG. 10 by the structure shown in FIG. 11.

The hydraulic brake system has a different structure from that shown in FIG. 11. Control over the hydraulic brake system is different from that shown in FIG. 12, and this control is a characteristic feature of the present invention.

The hydraulic brake system is composed of a booster 50 for increasing the pressure caused by the stepping of the brake pedal 18; the M/C 20 for generating the fluid pressure corresponding to the boost pressure of the brake pedal 18; W/Cs 52 of the RWs 44; the W/C 26 of the FWs 10; the pipes 22 and 24 for connecting one of the hydraulic chambers in the M/C 20 to the W/Cs 26 provided in the FWs 10; and the pipe 28 for connecting the other hydraulic chamber in the M/C 20 to the W/Cs 52 provided in the RWs 44.

The hydraulic brake system is further provided with solenoid valves 54 and 56 provided between the pipes 22 and 24 in alignment therewith. The pipe 22 and the S/S 38 are disconnected when the solenoid valve 54 is off, while they are connected when the solenoid valve 54 is on. The solenoid valve 54 and the pipe 24 are disconnected when the solenoid valve 56 is off, while they are connected when the solenoid valve 56 is on. The on/off operations of the solenoid valves 54 and 56 are controlled by the ECU 16. The S/S 38 consumes the hydraulic fluid of the M/C 20 in a similar way to the W/Cs 26 when the fluid pressure of the W/Cs 26 is higher than $P_0$. The fluid consumption by the S/S 38 bottoms out when the fluid pressure reaches $\Delta P_r$.

The relief valve 30 is inserted between the pipes 22 and 24 in parallel with the solenoid valves 54 and 56. The relief valve 30 is opened when the pressure difference $\Delta P$ between the pipes 22 and 24 (i.e, the difference between the M/C pressure and the W/C pressure of the W/C 26) exceeds the valve opening pressure $\Delta P_r$, while it is closed when the pressure difference $\Delta P$ is not higher than $\Delta P_r$. The check valve 34 is further provided in parallel to the relief valve 30 in order to maintain the pressure difference $\Delta P$. A fluid pressure sensor 58 detects the M/C pressure, and a fluid pressure sensor 60 detects the W/C pressure of the W/Cs 26, and these sensors 58 and 60 output the respective detected values to the ECU 16. In the following explanation, the W/C pressure of the W/Cs 26 will be referred to as "W/C pressure" so as to simplify the explanation.

Figure 2:
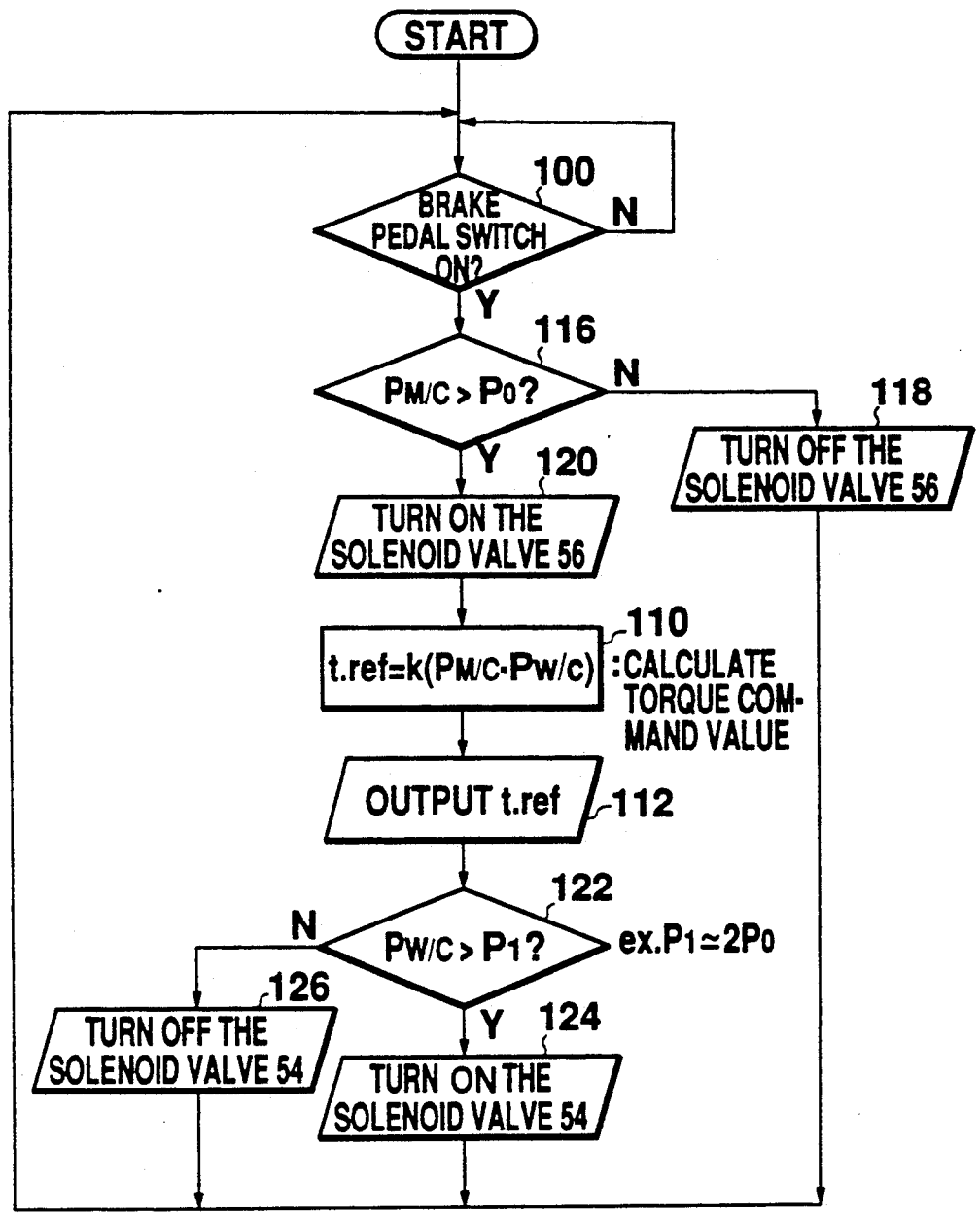
FIG. 2 is a flowchart of the control of the ECU in the first embodiment.

FIG. 2 shows the flow of the braking control by the ECU 16.

The ECU 16 first judges whether or not the brake pedal switch 40 is on (step 100). The brake pedal switch 40 is attached to the brake pedal 18 and is turned on when the brake pedal 18 is pressed down.

If the brake pedal switch 40 is not on at step 100, the brake pedal 18 has not been pressed down. In this case, the ECU 16 stands by while executing other routines (not shown).

Figure 13:
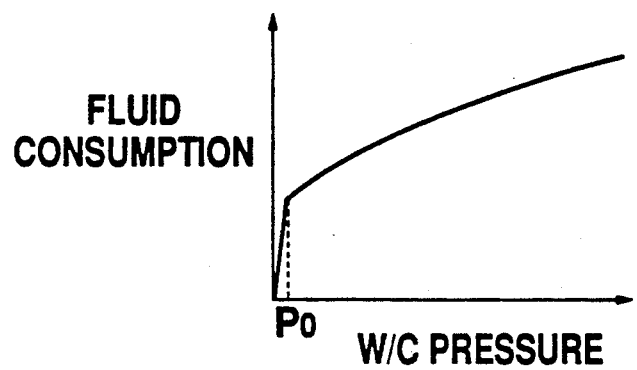
FIG. 13 shows the fluid consumption characteristic of the W/C in the structure shown in FIG. 11.
Figure 14:
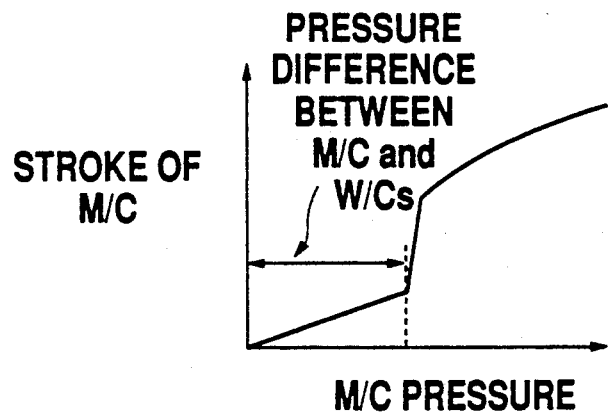
FIG. 14 shows the characteristic of the M/C stroke in the control shown in FIG. 10.

If the brake pedal switch 40 is on at step 100, the ECU 16 judges the brake pedal 18 to have been pressed down. In this case, the ECU 16 compares the M/C pressure $P_{M/C}$ detected by the fluid pressure sensor 58 with $P_0$ (step 116). $P_0$ is the fluid pressure at which the rising characteristic of the fluid consumption of the W/C 26 finishes, as shown in FIG. 13.

Figure 3A:
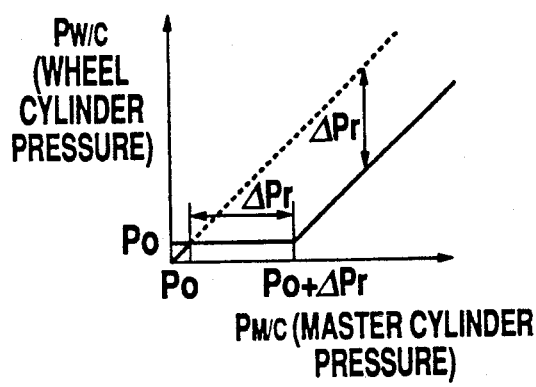
Figure 3D:
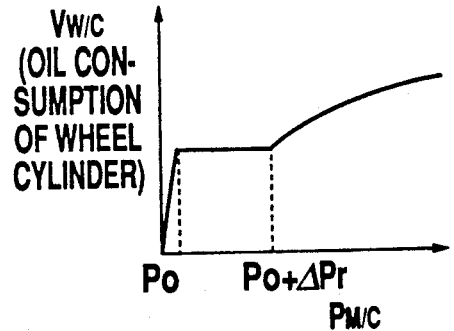
Figure 3B:
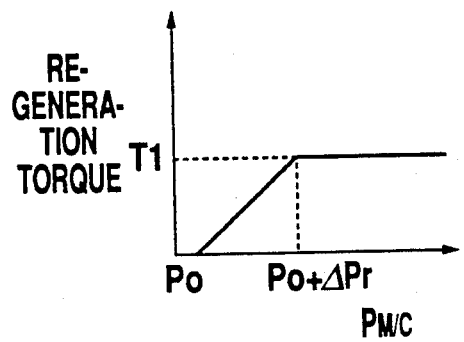
Figure 3E:
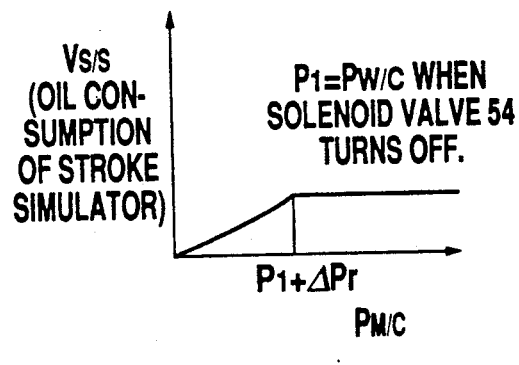
Figure 3C:
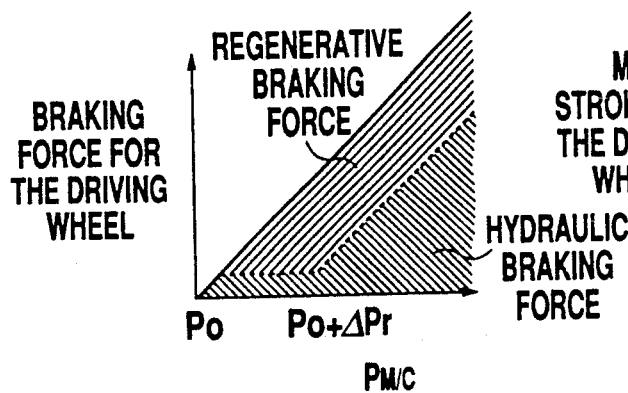

If $P_{M/C}$ is judged not to exceed $P_0$ at step 116, in other words, the stepping of the brake pedal 18 by the driver is very shallow, the ECU 16 turns off the solenoid valve 56 (step 118). It is now assumed that the solenoid valve 54 is in off state at the initial stage. Therefore, after step 118, both the solenoid valves 54 and 56 are in off state, so that the pipes 22 and 24 communicate with each other, and the M/C pressure $P_{M/C}$ is transmitted to the W/Cs 26. In this way, when the M/C pressure $P_{M/C}$ is not higher than $P_0$, the W/C pressure $P_{W/C}$ is equal to $P_{M/C}$, as shown in FIG. 3A. In this case, since later-described steps 110 and 112 are not executed and regeneration is therefore not executed, as shown in FIG. 3B, the W/C 26 is hydraulically braked by $P_{M/C}$, as shown in FIG. 3C.

Figure 3F:
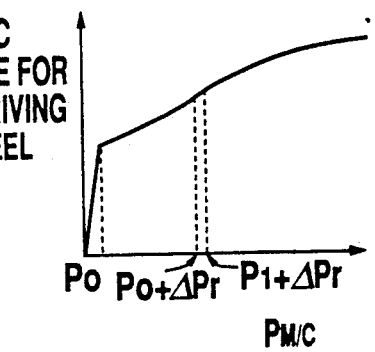

The hydraulic fluid in the M/C 20 is consumed by the W/Cs 26 as well as the S/S 38. The characteristic curve of the fluid consumption $V_{W/C}$ of the W/C 26 steeply rises when the W/C pressure $P_{W/C}$ is not higher than $P_0$, as shown in FIGS. 3D and 13. On the other hand, a characteristic of the fluid consumption $V_{S/S}$ of the S/S 38 when the M/C pressure $P_{M/C}$ is not higher than $P_1 + \Delta P_r$ is approximate to the fluid consumption characteristic (shown in FIG. 13) of the W/C 26 when the W/C pressure $P_{W/C}$ is higher than $P_0$, as shown in FIG. 3E. $P_1$ is the W/C pressure $P_{W/C}$ at which the ECU 16 turns off the solenoid valve 54 at later-described step 122. Consequently, when the M/C pressure $P_{M/C}$ is not higher than $P_0$, the stroke of the M/C 20 is determined mainly by the fluid consumption $V_{W/C}$ of the W/Cs 26, as shown in FIG. 3F. The stroke of the M/C 20 here means the stroke for the FWs 10.

After step 118, the process returns to step 100.

If $P_{M/C}$ is judged to be higher than $P_0$ at step 116, the ECU 16 turns on the solenoid valve 56 (step 120). Since the pipes 22 and 24 are disconnected by this operation, the pressure difference $\Delta P$ between the pipes 22 and 24 is applied to the relief valve 30 and is retained by the check valve 34. The relief valve 30 is opened when $\Delta P$ reaches $\Delta P_r$.

Consequently, after the M/C pressure $P_{M/C}$ exceeds $P_0$, the W/C pressure $P_{W/C}$ is maintained at $P_0$ until the M/C pressure $P_{M/C}$ reaches $P_0 + \Delta P_r$, as shown in FIG. 3A. Therefore, the hydraulic braking force applied to the FWs 10 is not larger than the braking force corresponding to $P_0$, as indicated by the broken line in FIG. 3C. In the range in which the M/C pressure $P_{M/C}$ takes such a value, the fluid consumption of the W/Cs 26 does not generate, as shown in FIG. 3D, so that the hydraulic fluid is only consumed by the S/S 38. In this range, the stroke of the M/C 20 is therefore determined by fluid consumption $V_{S/S}$ of the S/S 38. The fluid consumption $V_{S/S}$ of the S/S 38 has a characteristic approximate to the fluid consumption characteristic of the W/Cs 26 when the W/C pressure $P_{M/C}$ is higher than $P_0$. The stroke of the M/C 20 is therefore similar to the fluid consumption characteristic of the W/Cs 26 shown in FIG. 13 in the range in which the M/C pressure $P_{M/C}$ exceeds $P_0$ and reaches $P_0 + \Delta P_r$, as shown in FIG. 3F.

When the M/C pressure $P_{M/C}$ exceeds $P_0 + \Delta P_r$, the relief valve 30 opens, thereby increasing the W/C pressure $P_{W/C}$. At this time, the valve opening pressure $\Delta P_r$ of the relief valve 30 is retained by the check valve 34. Accordingly, the W/C pressure $P_{W/C}$ (indicated by the solid line in FIG. 3A) is lower than the M/C pressure $P_{M/C}$ (indicated by the broken line in FIG. 3A) by $\Delta P_r$. In other words, the W/C pressure $P_{W/C}$ linearly increases with approximately the same gradient as the M/C pressure $P_{M/C}$. Since the fluid consumption of the W/Cs 26 begins to increase, the stroke of the M/C 20 also increases in accordance with the fluid consumption characteristic of the W/Cs 26.

The process proceeds from step 120 to step 110. At step 110, the ECU 16 calculates the regeneration torque command value t.ref on the basis of the difference between the M/C pressure $P_{M/C}$ and the W/C pressure $P_{W/C}$. In FIG. 2, k represents a proportional constant. The ECU 16 then outputs the calculated regeneration torque command value t.ref (step 112). When the FW 10 is regeneratively braked in accordance with the regeneration torque command value t.ref, the regeneration torque, namely, the regenerative braking force shown in FIG. 3B is generated. The proportional constant k is set so that the braking force shown in FIG. 3C is obtained when the regenerative braking force is added to the hydraulic braking force. That is, by the appropriate setting of the proportional constant k, it is possible to obtain the braking force which is linear with respect to the M/C pressure $P_{M/C}$ and which is well balanced with the braking force (only the hydraulic braking force) for the RWs 44.

After step 112, the ECU 16 judges whether or not the W/C pressure $P_{W/C}$ exceeds $P_1$ (step 122). $P_1$ is set at, for example, about $2P_0$. If the W/C pressure $P_{W/C}$ exceeds $P_1$ at step 122, the ECU 16 turns on the solenoid 54 (step 124). On the other hand, if the W/C pressure $P_{W/C}$ does not exceed $P_1$, the ECU 16 turns off the solenoid 54 (step 126). The process then returns to step 100.

In other words, when the W/C pressure $P_{W/C}$ is comparatively low ($P_0 < P_{W/C} < P_1$), the transmission of the fluid pressure to the S/S 38 is maintained, and the simulation of the fluid consumption characteristic of the W/Cs 26 is continued by the S/S 38. It is when the relief valve 30 is opened and the consumption of the hydraulic fluid by the W/Cs 26 is resumed that the simulation by the S/S 38 is not necessary. At step 122, whether or not the simulation is necessary is judged by the detection of the W/C pressure $P_{W/C}$. The ECU 16 detects a rise in $P_{W/C}$ by using $P_1$, which is approximately the same as or larger than $P_0$ as the resumption of the consumption of the hydraulic fluid by the W/C 26.

When $P_1 \leq P_{W/C}$, namely, $P_1 + \Delta P_r \leq P_{M/C}$, the transmission of the fluid pressure to the S/S 38 is cut off at step 124, so that the fluid consumption $V_{S/S}$ of the S/S 38 is not increased, as shown in FIG. 3E. As a result, in the range in which $P_1 + \Delta P_r \leq P_{M/C}$ the stroke of the M/C 20 is determined by the fluid consumption characteristic of the W/C 26.

In this way, according to this embodiment, it is possible to apply the braking force for the FWs 10 which is linear with respect to the M/C pressure $P_{M/C}$ and which is well balanced with the braking force for the RWs 44, and to obtain the M/C stroke which is approximate to the M/C stroke shown in FIG. 13, as shown in FIG. 3F. Thus, the feeling of braking is improved.

Second Embodiment

Figure 4:
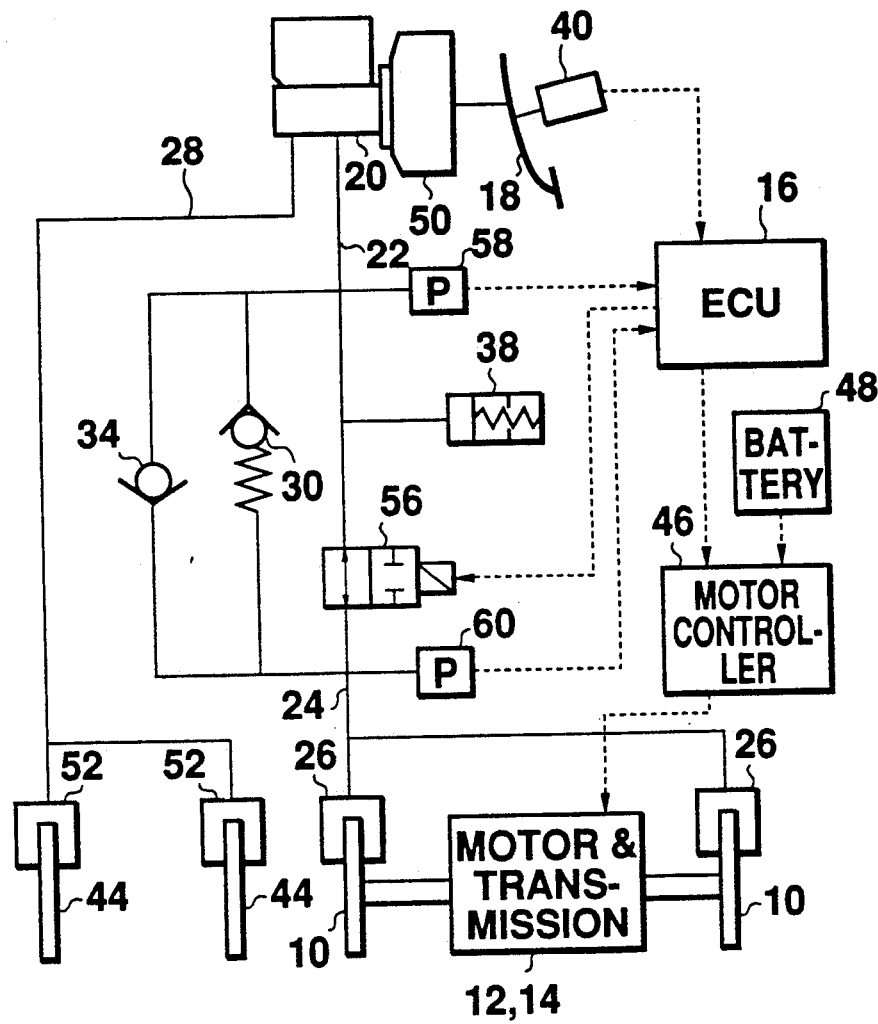
FIG. 4 is a schematic block diagram of the structure of an electric vehicle provided with a second embodiment of a brake controlling apparatus according to the present invention.

FIG. 4 is a schematic block diagram of the structure of an electric vehicle provided with a second embodiment of a brake controlling apparatus according to the present invention. The same reference numerals are provided for the elements which are the same as those in the first embodiment.

Figure 5:
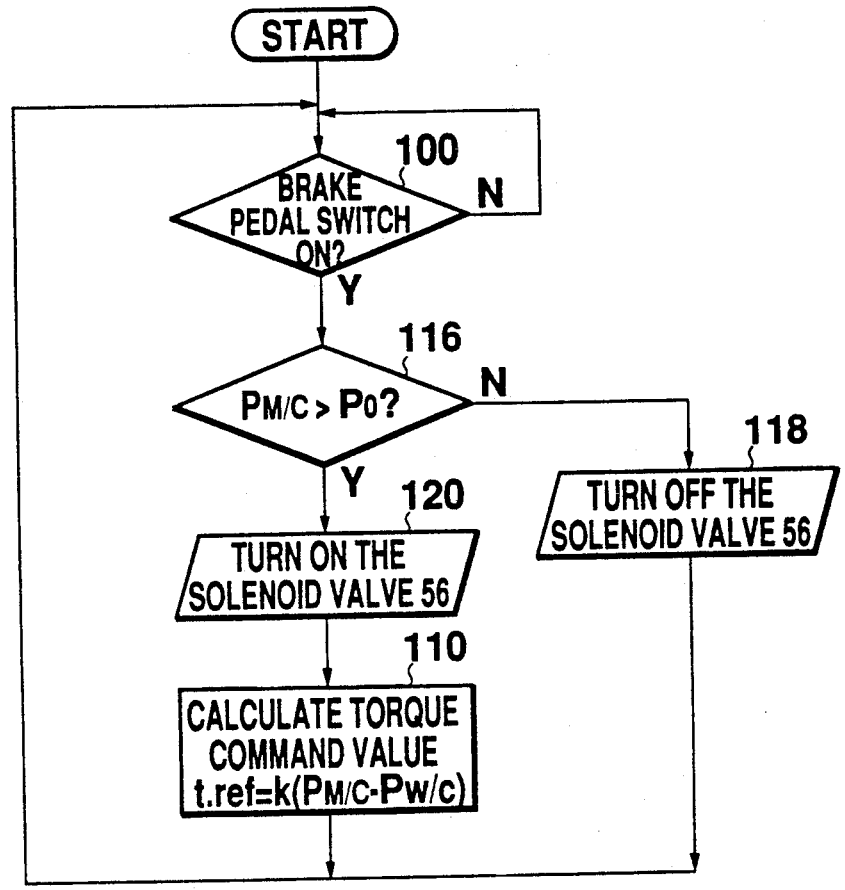
FIG. 5 is a flowchart of the control of the ECU in the second embodiment.

This embodiment is so designed that the fluid consumption of the S/S 38 bottoms out at the valve opening pressure $\Delta P_r$. According to this structure, the solenoid valve 54 is obviated, thereby simplifying the apparatus and facilitating the control. As shown in FIG. 5, steps 122 to 126 in the first embodiment are obviated in this embodiment.

Third Embodiment

Figure 6:
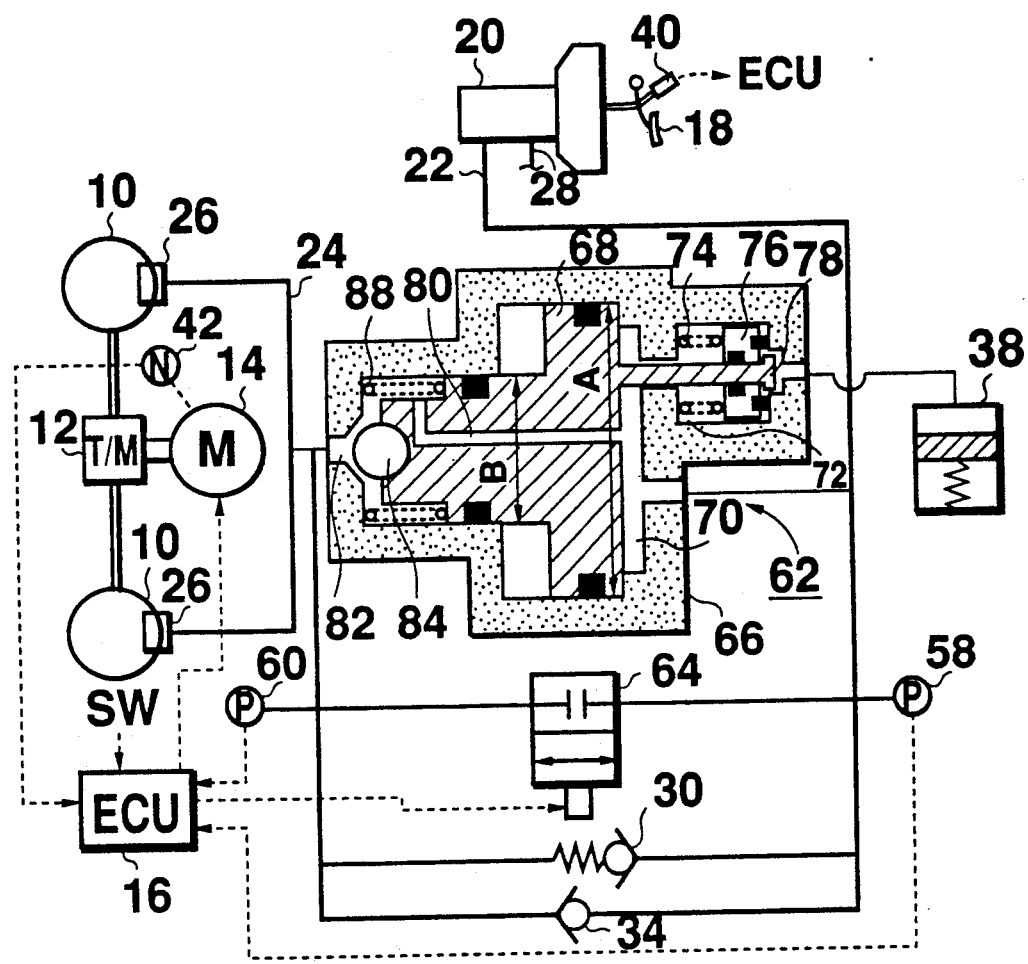
FIG. 6 is a schematic block diagram and a partial sectional view of the structure of an electric vehicle provided with a third embodiment of a brake controlling apparatus according to the present invention.

FIG. 6 is a schematic block diagram of the structure of an electric vehicle provided with a third embodiment of a brake controlling apparatus according to the present invention. The same reference numerals are provided for the elements which are the same as those in the first and second embodiments. In this embodiment, the transmission of the fluid pressure is mechanically cut off not by the control of a solenoid valve but by a cut valve.

In this embodiment, a cut valve 62 and a solenoid valve 64 are provided between the pipes 22 and 24 in addition to the relief valve 30 and the check valve 34. The cut valve 62 is so designed as to transmit the M/C pressure $P_{M/C}$ to the W/Cs 26 through the pipe 24 as it is until the M/C pressure $P_{M/C}$ rises to $P_0$, and to introduce the hydraulic fluid to the S/S 38 when the M/C pressure $P_{M/C}$ reaches $P_0$. The details of the cut valve 62 will now be explained.

The cut valve 62 is composed of a piston 68 accommodated in a housing 66. The piston 68 has a large-diameter portion and a small-diameter portion. The diameter of the large-diameter portion is A, and the diameter of the small-diameter portion is B. The large-diameter portion having a diameter of A is accommodated in a chamber 70 provided in the housing 66. The inner diameter of the chamber 70 is A, and the chamber 70 functions as a cylinder for guiding the axial movement of the piston 68. The pipe 22 is connected to the chamber 70 so as to introduce the M/C pressure into the chamber 70. The chamber 70 communicates with a chamber 72.

A valve 76 provided in the chamber 72 is urged by a spring 74. The valve 76 is fixed to the end of a rod 78 which projects from the right end surface of the piston 68. If the inner pressure of the chamber 70 is small, the valve 76 is closed by the urging force of the spring 74, thereby cutting off the flow of the hydraulic fluid to the S/S 38. The force exceeding the urging force of the spring 74 is applied to the piston 68 in the leftward direction in FIG. 6, the valve 76 is opened, thereby introducing the hydraulic fluid of the M/C 20 to the S/S 38 through the pipe 22, the chamber 70 and the chamber 72. When the hydraulic fluid is introduced to the S/S 38, simulation of the fluid consumption characteristic of the W/Cs 26 by the S/S 38 is started.

The chamber 70 also communicates with a chamber 82 which accommodates the small-diameter portion of the piston 68 having a diameter of B through a passage 80 which penetrates the piston 68. A ball valve 84 is formed on the left end surface of the piston 68, namely, the end surface of the small-diameter portion. A spring 88 is disposed in the chamber 82 so as to urge the piston 68 rightward in FIG. 6. When a predetermined force is applied to the piston 68 in the leftward direction in FIG. 6, the connection between the cut valve 62 and the pipe 24 is cut off. That is, the passage from the pipe 22 and the pipe 24 through the cut valve 62 is blocked by the ball valve 84.

The M/C pressure $P_{M/C}$ in the cut valve 62 is as described below. Since the area of the end surface of the large-diameter portion of the piston 68 in the chamber 70 is proportional to $A^2$, the force applied to the end surface in the leftward direction in FIG. 6 is proportional to $P_{M/C} \times A^2$. On the other hand, since the area of the end surface of the small-diameter portion of the piston 68 in the chamber 82 is proportional to $B^2$, the force applied to the end surface in the rightward direction in FIG. 6 is proportional to $P_{M/C} \times B^2$. Consequently, the force applied to the piston 68 is proportional to $P_{M/C} \times (A^2 - B^2)$, where it is assumed that the leftward direction in FIG. 6 is positive direction.

While this force is smaller than the urging force of the spring 88 (it is here assumed that the urging force of the spring 74 is sufficiently smaller than that of the spring 88 in order to simplify the explanation), the M/C pressure $P_{M/C}$ is transmitted to the W/Cs 26 through the pipe 22, the chamber 70, the passage 80, the chamber 82 and the pipe 24. When the force applied to the piston 68 exceeds the urging force of the spring 88 and the passage to the pipe 24 is blocked by the ball valve 84, the M/C pressure $P_{M/C}$ is not transmitted to the W/C 26, and the W/C pressure $P_{W/C}$ stops rising at this point.

If the pressure at which the ball valve 84 blocks the passage is set at $P_0$ at which the rising characteristic of the fluid consumption of the W/Cs 26 finishes, it is possible to apply the M/C pressure $P_{M/C}$ to the W/Cs 26 until the M/C pressure $P_{M/C}$ reaches $P_0$. At the point of time when the ball valve 84 blocks the passage, the force applied to the piston 68 has already exceeded the urging force of the spring 74. In this state, since the S/S 38 starts simulation of the stroke of the W/Cs 26, the M/C stroke is maintained in the same way as in the case of using only the hydraulic brake although the transmission of the M/C pressure $P_{M/C}$ is cut off. The balance of the braking force between the FWs and RWs is thus secured.

When the solenoid valve 64 is turned on, the pipes 22 and 24 are connected, while when it is turned off, these pipes are disconnected. The solenoid valve 64 is controlled by the ECU 16 in accordance with the outputs of the brake pedal switch 40 and the revolution sensor 42, as will be described later.

Figure 7:
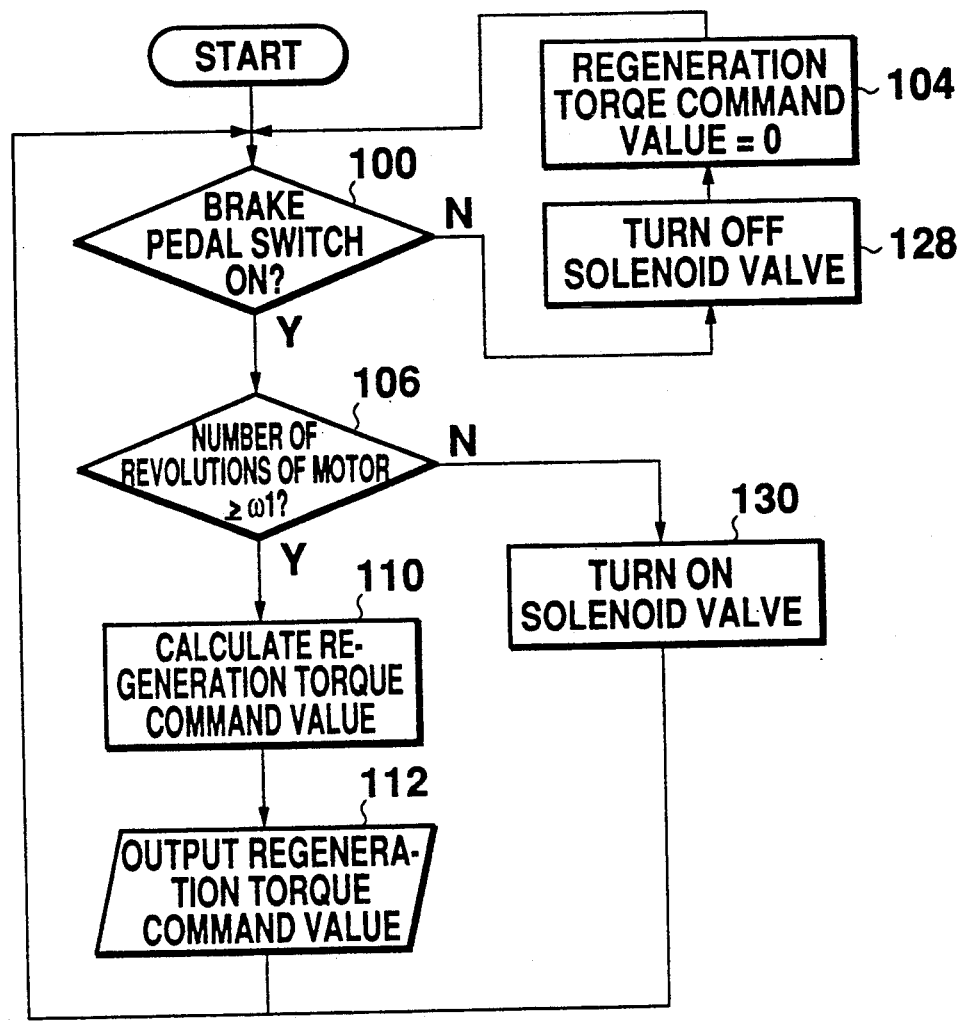
FIG. 7 is a flowchart of the control of the ECU in the third embodiment.

FIG. 7 shows the flow of the operation of the third embodiment. Step 100 is first executed. If the brake pedal switch 40 is off, the ECU 16 turns off the solenoid valve 64 (step 128) so as to cut off the flow of hydraulic fluid through the solenoid valve 64. The regeneration torque command value is reset to 0 and the process returns to step 100. Accordingly, until the brake pedal switch 40 is turned on, the FWs 10 are not braked.

When the brake pedal switch 40 is turned on, the ECU 16 compares the number of revolutions of the motor 14 which is detected by the revolution sensor 42 with $\omega_1$ (step 106). If the number of revolutions is smaller than $\omega_1$, the ECU 16 turns on the solenoid valve 64 (step 130), and the process then returns to step 100. In this state, since the pipes 22 and 24 are connected through the solenoid valve 64, the M/C pressure $P_{M/C}$ is transmitted to the W/Cs 26, thereby applying the hydraulic braking force to the FWs 10.

If the number of revolutions of the motor 14 is not smaller than $\omega_1$ at step 106, the calculation of the regeneration torque command value (step 110) and the output of the calculated regeneration torque command value (step 112) are executed, and the process then returns to step 100. Since the solenoid valve 64 was turned off (step 128) before the brake pedal switch 40 was turned on, the M/C pressure $P_{M/C}$ is transmitted to the W/Cs 26 through the cut valve 62 if the M/C pressure $P_{M/C}$ is not higher than $P_0$, thereby applying the hydraulic braking force to the FWs 10. If the M/C pressure $P_{M/C}$ is higher than $P_0$, the transmission of the M/C pressure $P_{M/C}$ is cut off, and the W/C pressure $P_{W/C}$ remains $P_0$ until the difference between M/C pressure $P_{M/C}$ and the W/C pressure $P_{W/C}$ becomes the valve opening pressure $\Delta P_r$ of the relief valve 30. When the difference between M/C pressure $P_{M/C}$ and the W/C pressure $P_{W/C}$ becomes the valve opening pressure $\Delta P_r$, the W/C pressure $P_{W/C}$ begins to increase while the pressure difference $\Delta P_r$ is maintained by the check valve 34. In this embodiment, the fluid consumption of the S/S 38 bottoms out at $\Delta P_r$.

Figure 8A:
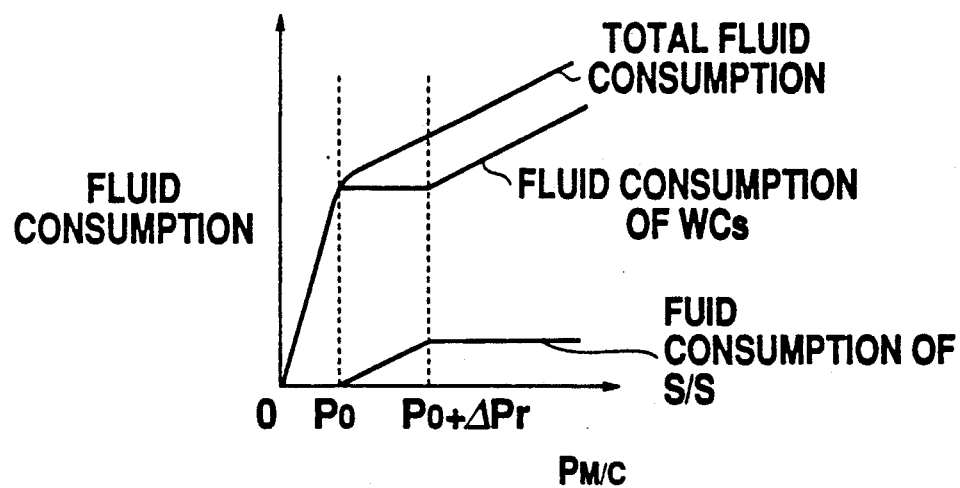
FIG. 8A shows the fluid consumption characteristic with respect to the M/C pressure in the third embodiment.

According to this embodiment, the braking force is linear with respect to the M/C pressure $P_{M/C}$ and is well balanced between the FW and RW. In addition, as shown in FIG. 3F, the fluid consumption observed at the M/C 20, namely the M/C stroke, is approximate to the M/C stroke shown in FIG. 13, which is the case of using only the hydraulic brake. Thus, the feeling of braking is improved. This is because the fluid consumption of the W/Cs 26 contributes to the M/C stroke until the M/C pressure $P_{M/C}$ reaches $P_0$, the fluid consumption of the S/S 38 contributes to the M/C stroke while the M/C pressure $P_{M/C}$ is between $P_0$ and $P_0+\Delta P_r$, and the fluid consumption of the W/Cs 26 again contributes to the M/C stroke thereafter, as shown in FIG. 8A.

Figure 8B:
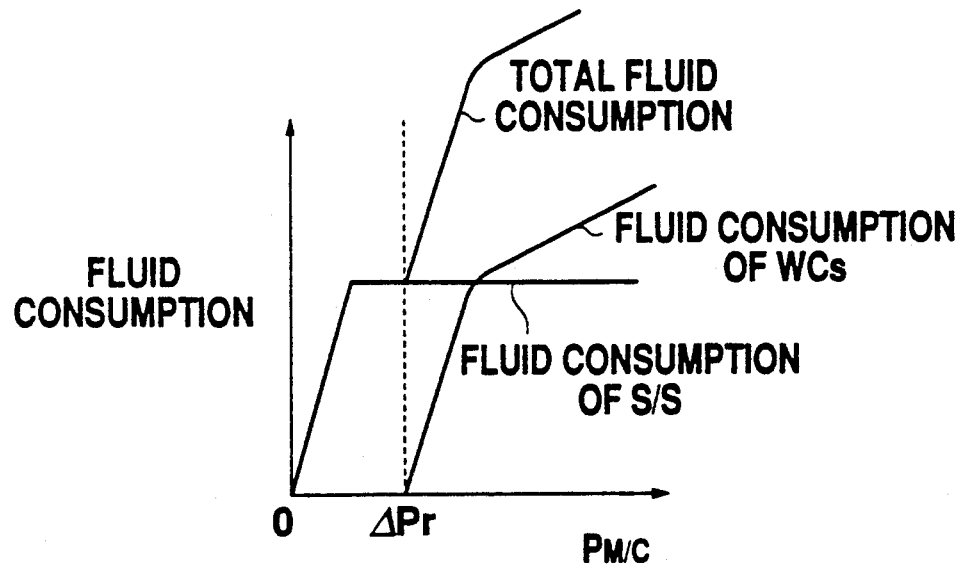
FIG. 8B shows the fluid consumption characteristic with respect to the M/C pressure in the structure shown in FIG. 11.
Figure 9:
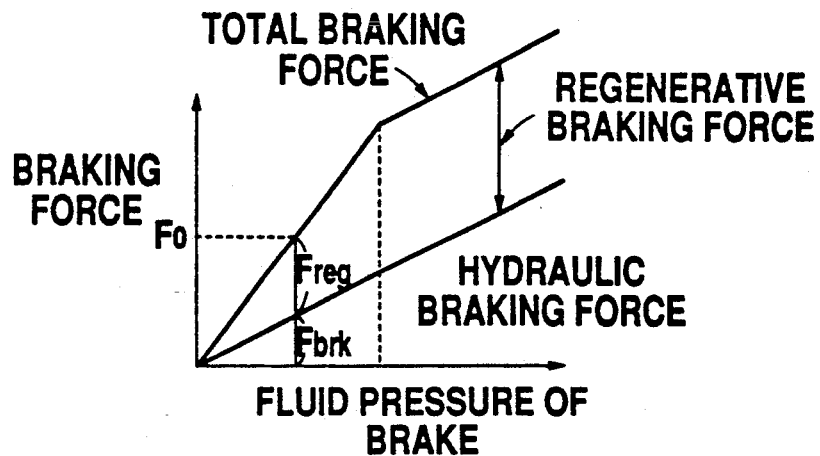
FIG. 9 shows the characteristic of the braking force with respect to the fluid pressure in the case of using both hydraulic brake and regenerative brake.
Figure 10:
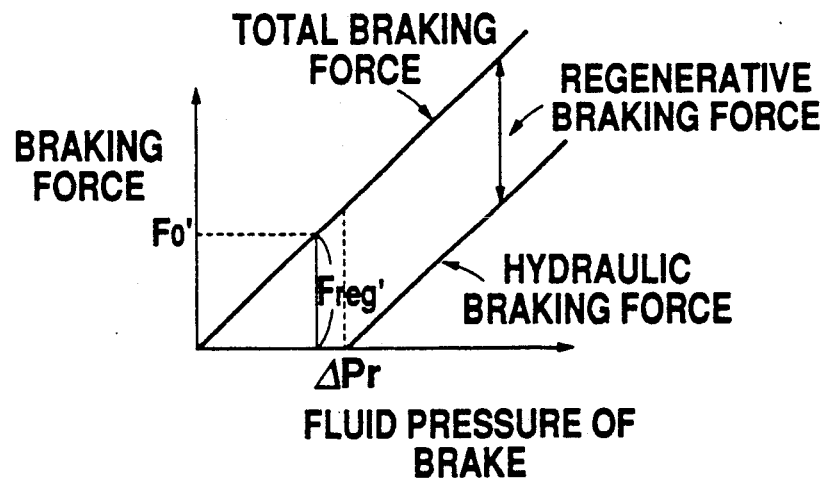
FIG. 10 shows the characteristic of the braking force with respect to the fluid pressure in the structure shown in FIG. 11.

In the apparatus shown in FIG. 11, since it is not until the M/C pressure $P_{M/C}$ reaches $\Delta P_r$ that the W/C 30 begins to consume the hydraulic fluid, as shown in FIG. 8B, the gradient of the fluid consumption characteristic curve of the S/S 38 must be made enough large in order to obtain the feeling of smooth braking. In contrast, according to this embodiment, since it is possible to reduce the gradient of the curve, a smaller-sized S/S 38 can be realized.

In this way, the third embodiment can produce similar advantages to those of the first and second embodiments. In addition, since the number of solenoid valves is reduced in this embodiment, the reliability is enhanced and the control flow is simplified.

Although the brake controlling apparatus is installed in an electric vehicle in these embodiments, it may be installed in a vehicle provided with an engine as well as a motor such as a hybrid vehicle.

As described above, according to the present invention, since the M/C pressure is added to the W/Cs when the M/C pressure is not higher than $P_0$, and the fluid consumption of the W/Cs 26 is simulated when the M/C pressure is between $P_0$ and $P_0+\Delta P_r$, the M/C stroke and, hence, the feeling of braking is improved. If a mechanical system such as a cut valve is used, the reliability of the apparatus is further enhanced.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A brake controlling apparatus installed in an electric vehicle provided with a hydraulic braking means and a regenerative braking means, wherein said hydraulic braking means includes a fluid pressure generating means for generating a fluid pressure in accordance with the command for braking and a fluid pressure applying means having a characteristic in which the fluid consumption rises in the fluid-pressure range of 0 to $P_0$, and brakes driving wheels by the fluid pressure of said fluid pressure applying means, and said regenerative braking means brakes the driving wheels by the regeneration of the power of a driving motor, said brake controlling apparatus comprising:

a fluid flow cut-off means for cutting off the flow of hydraulic fluid from said fluid pressure generating means to said fluid pressure applying means when the fluid pressure of said fluid pressure generating means exceeds $P_0$;

a fluid flow inducing means for inducing the flow of hydraulic fluid from said fluid pressure generating means to said fluid pressure applying means while maintaining the pressure difference between said fluid pressure generating means and said fluid pressure applying means when the pressure difference exceeds $\Delta P_r$;

a fluid consuming means for consuming the hydraulic fluid of said fluid pressure generating means with the characteristic approximate to the fluid consumption characteristic of said fluid pressure applying means when said fluid flow inducing means is inoperative; and a regenerative braking controlling means for controlling said regenerative braking means in correspondence with the pressure difference between said fluid pressure generating means and said fluid pressure applying means;

wherein the fluid consumption characteristic observed at said fluid pressure generating means is approximate to the fluid consumption characteristic of said fluid pressure applying means.

2. A brake controlling apparatus according to claim 1, wherein said hydraulic braking means includes a booster for increasing the pressure caused by the stepping of a brake pedal and applying the increased pressure to said fluid pressure generating means.

3. A brake controlling apparatus according to claim 1, wherein said hydraulic braking means brakes idler wheels by the fluid pressure of said fluid pressure applying means.

4. A brake controlling apparatus according to claim 1, wherein said hydraulic braking means includes:

a pipe for connecting said fluid pressure generating means with said fluid flow cut-off means and said fluid flow inducing means; and a pipe for connecting said fluid flow cut-off means and said fluid flow inducing means with said fluid pressure applying means.

5. A brake controlling apparatus according to claim 1, wherein said regenerative braking means includes:

a power converting means for converting a DC power into an AC power and supplying the converted power to said driving motor; and a means for controlling said power converting means in correspondence with the required regenerative braking force so as to generate said regenerative braking force by said power converting means.

6. A brake controlling apparatus according to claim 1, wherein said fluid flow cut-off means includes:

a valve which is inserted between said fluid pressure generating means and said fluid pressure applying means so as to be opened or closed under control;

a means for detecting the fluid pressure of the fluid pressure generating means;

a means for judging whether or not the fluid pressure of said fluid pressure generating means exceeds $P_0$; and a means for forcibly opening said valve when the fluid pressure of said fluid pressure generating means is judged to be not higher than $P_0$.

7. A brake controlling apparatus according to claim 6, wherein said fluid consuming means includes a stroke simulator which is provided closer to said fluid pressure generating means as observed at said valve so as to consume the hydraulic fluid of said fluid pressure generating means with the fluid consumption characteristic which is approximate to that of said fluid pressure applying means.

8. A brake controlling apparatus according to claim 7, wherein said fluid flow inducing means includes:
a reducing valve inserted between said fluid pressure generating means and said fluid pressure applying means so as to be opened when the pressure difference therebetween exceeds $\Delta P_r$; and
a check valve inserted between said fluid pressure generating means and said fluid pressure applying means so as to maintain the pressure difference therebetween;
wherein the fluid consumption of said stroke simulator reaches its maximum when said reducing valve is opened.

9. A brake controlling apparatus according to claim 1, wherein said fluid flow cut-off means includes:
a first valve which is inserted between said fluid pressure generating means and said fluid pressure applying means so as to be opened or closed under control;
a second valve which is inserted between said fluid pressure generating means and said first valve so as to be opened or closed under control;
a means for detecting the fluid pressure of said fluid pressure generating means;
a means for detecting the fluid pressure of said fluid pressure applying means;
a means for judging whether or not the fluid pressure of said fluid pressure generating means exceeds $P_0$;
a means for forcibly opening said first valve when the fluid pressure of said fluid pressure generating means is judged to be not higher than $P_0$;
a means for judging whether or not the fluid pressure of said fluid pressure applying means is higher than $P_1$, which is not lower than $P_0$; and
a means for forcibly opening said second valve when the fluid pressure of said fluid pressure applying means is judged to be higher than $P_1$, and forcibly closing said second valve when the fluid pressure of said fluid pressure applying means is judged to be not higher than $P_1$.

10. A brake controlling apparatus according to claim 9, wherein said fluid consuming means includes a stroke simulator which is provided between said second valve and said first valve so as to consume the hydraulic fluid of said fluid pressure generating means with the fluid consumption characteristic which is approximate to that of said fluid pressure applying means when said second valve is opened and said first valve is closed.

11. A brake controlling apparatus according to claim 1, wherein said fluid flow inducing means includes:
a reducing valve inserted between said fluid pressure generating means and said fluid pressure applying means so as to be opened when the pressure difference therebetween exceeds $\Delta P_r$; and
a check valve inserted between said fluid pressure generating means and said fluid pressure applying means so as to maintain the pressure difference therebetween.

12. A brake controlling apparatus according to claim 1, wherein said regenerative braking controlling means includes:
a means for detecting the fluid pressure of said fluid pressure generating means;
a means for detecting the fluid pressure of said fluid pressure applying means;
a means for obtaining the difference of the fluid pressure of said fluid pressure generating means and the fluid pressure of said fluid pressure applying means; and
a means for commanding said regenerative braking means to output the regenerative braking force on the basis of the pressure difference obtained.

13. A brake controlling apparatus according to claim 1 further comprising:
a means for detecting the demand for braking;
a second fluid flow cut-off means for cutting off the flow of hydraulic fluid from said fluid pressure generating means to said fluid pressure applying means when said demand for braking is not detected; and
a regeneration inhibiting means for commanding said regenerative braking means not to execute regenerative braking when said demand for braking is not detected.

14. A brake controlling apparatus according to claim 1 wherein said fluid flow cut-off means is a cut valve provided between said fluid pressure generating means and said fluid pressure applying means and having a cut-off mechanism for cutting off the flow of hydraulic fluid to said fluid pressure applying means when the fluid pressure of said fluid pressure generating means exceeds $P_0$.

15. A brake controlling apparatus according to claim 14 wherein said cut-off mechanism includes:
a fluid introduction chamber into which the hydraulic fluid of said fluid pressure generating means is introduced;
a fluid displacement chamber which communicates with said fluid pressure applying means;
a movable member for partitioning said fluid introduction chamber and said fluid displacement chamber;
an urging member for urging said movable member toward said fluid introduction chamber, said urging force of said urging member being approximately equal to the synthesis of the force applied to said moving member by the hydraulic fluid existing in said fluid introduction chamber and the force applied to said moving member by the hydraulic fluid existing in said fluid displacement chamber when the fluid pressure of said fluid pressure generating means is $P_0$;
a passage for connecting said fluid introduction chamber and said fluid displacement chamber; and
a valve for cutting off the connection between said fluid displacement chamber and said fluid pressure applying means when the synthesized force is larger than the urging force of said urging member.

16. A brake controlling apparatus according to claim 14, wherein said cut valve includes a fluid introducing mechanism for introducing the hydraulic fluid of said fluid pressure generating means.

17. A brake controlling apparatus according to claim 16, wherein said fluid introducing mechanism includes:

a fluid introduction chamber into which the hydraulic fluid of said fluid pressure generating means is introduced;

a shunting chamber which communicates with said fluid introduction chamber; and a valve which is opened so as to introduce the hydraulic fluid in said shunting chamber to said fluid consuming means when said fluid pressure of said fluid introducing chamber exceeds a predetermined value.

18. A brake controlling apparatus according to claim 14, further comprising:

a reducing valve inserted between said fluid pressure generating means and said fluid pressure applying means so as to be opened when the pressure difference therebetween exceeds $\Delta P_r$; and a check valve inserted between said fluid pressure generating means and said fluid pressure applying means so as to maintain the pressure difference therebetween.

19. A brake controlling apparatus according to claim 14, wherein said regenerative braking controlling means includes:

a means for detecting the fluid pressure of said fluid pressure generating means;

a means for detecting the fluid pressure of said fluid pressure applying means;

a means for obtaining the difference of the fluid pressure of said fluid pressure generating means and the fluid pressure of said fluid pressure applying means; and a means for outputting a regenerative braking force to said driving motor on the basis of the pressure difference obtained.

20. A brake controlling apparatus according to claim 14, further comprising:

a means for detecting the demand for braking;

a second fluid flow cut-off means for cutting off the flow of hydraulic fluid from said fluid pressure generating means to said fluid pressure applying means when said demand for braking is not detected; and a regeneration inhibiting means for commanding said regenerative braking means not to execute regenerative braking when said demand for braking is not detected.

* * * * *